United States Patent [19]

Garner

[11] 4,261,718
[45] Apr. 14, 1981

[54] FILTER BED OF COMPRESSED COILS

[75] Inventor: Herman H. Garner, Los Angeles County, Calif.

[73] Assignee: Vortox Company, Claremont, Calif.

[21] Appl. No.: 100,895

[22] Filed: Dec. 6, 1979

Related U.S. Application Data

[63] Continuation of Ser. No. 955,454, Oct. 27, 1978, abandoned.

[51] Int. Cl.³ ............................................. B01D 46/24
[52] U.S. Cl. ........................................ 55/520; 55/498; 55/521; 55/526; 261/DIG. 72
[58] Field of Search ................ 55/498, 520, 521, 525, 55/526, 529; 261/DIG. 72; 428/371, 397; 267/180

[56]  References Cited
U.S. PATENT DOCUMENTS

| 1,639,132 | 8/1927 | Greene | 55/498 |
| 1,748,830 | 2/1930 | Carlson | 55/520 |
| 2,322,513 | 6/1943 | Goodloe | 55/525 |
| 2,874,800 | 2/1959 | Vanderkock | 55/520 |
| 2,973,833 | 3/1961 | Cook | 55/521 |
| 3,494,366 | 2/1970 | Starbuck et al. | 55/521 |
| 4,110,418 | 8/1978 | Martin | 261/DIG. 72 |
| 4,116,647 | 9/1978 | Garner | 55/223 |

FOREIGN PATENT DOCUMENTS

| 635003 | 2/1962 | Italy | 267/180 |
| 319333 | 1/1972 | U.S.S.R. | 428/371 |
| 567479 | 8/1977 | U.S.S.R. | 261/DIG. 72 |

Primary Examiner—David L. Lacey

[57]  ABSTRACT

A filter bed for an air cleaner, or the like, comprising a compressed mass of coils each having axially spaced portions of different diameters. With this construction, the tendency of the coils to nest together over their entire lengths is reduced, and the filtering ability of the bed is increased.

5 Claims, 5 Drawing Figures

FILTER BED OF COMPRESSED COILS

This is a continuation of application Ser. No. 955,454, filed Oct. 10, 1978 now abandoned.

BACKGROUND OF THE INVENTION

The present invention relates in general to a filter bed for an air cleaner, or analogous apparatus, and, more particularly, to a filter bed of the type which comprises a compressed mass of coils, usually formed of metal wire. Filter beds of this character are commonly used in oil bath air cleaners for internal combustion engines. Merely as an example, an air cleaner of this nature is disclosed in my U.S. Pat. No. 4,116,647, issued Sept. 26, 1978.

At the present time, the coils used in such a filter bed are of constant diameter from end to end, i.e., they are cylindrical helices.

Longitudinally or axially overlapping portions of such constant-diameter coils tend to nest together, i.e., the overlapping convolutions thereof tend to interleave, to reduce the filtering ability of the compressed mass, which is an obvious disadvantage.

OBJECTS AND SUMMARY OF THE INVENTION

With the foregoing background in mind, the primary object of the invention is to provide a filter bed comprising a compressed mass of coils wherein the coils are so configured that the tendency of longitudinally overlapping portions thereof to nest is reduced, thereby increasing the filtering ability of the mass.

More particularly, the invention may be summarized as comprising, and an important object is to provide, a filter bed formed of a compressed mass of coils each having axially spaced portions of different diameters so that the tendency of longitudinally overlapping portions of the coils to nest is reduced, thereby increasing filtering ability.

Other objects are to provide coils having axially central portions of larger diameter, or end portions of larger diameter.

Another important object is to provide a structure wherein the convolutions of each coil are corrugated or kinked to provide oil retaining recesses which further increase filtering ability.

The foregoing objects, advantages, features and results of the present invention, together with various other objects, advantages, features and results which will become evident to those skilled in the oil bath filter art in the light of this disclosure, may be achieved with the exemplary embodiments illustrated in the accompanying drawing and described in detail hereinafter.

DESCRIPTION OF EXEMPLARY EMBODIMENTS OF INVENTION

Figure 1:
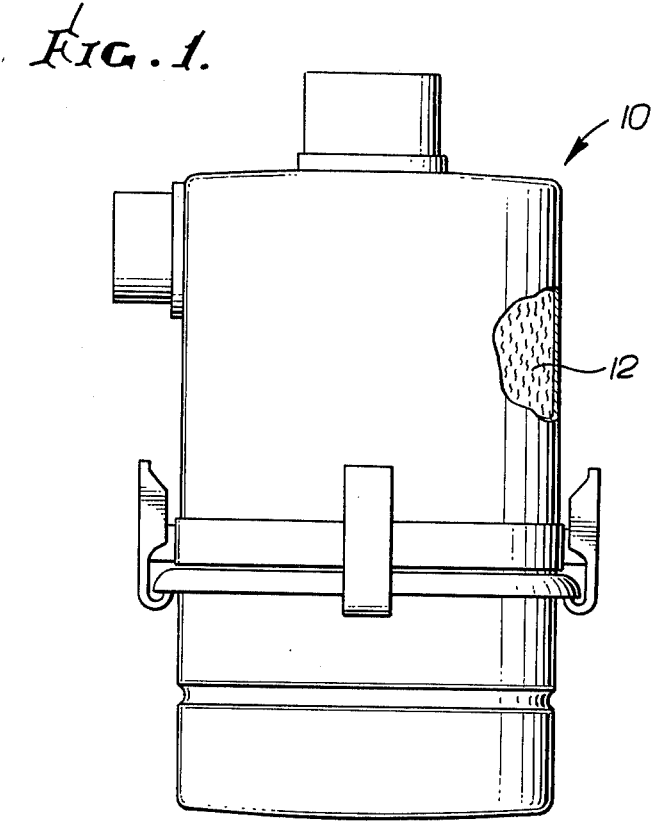
FIG. 1 is an elevational view, partially in section, of an oil bath air cleaner in which the filter bed of the present invention may be used, FIG. 1 illustrating in a general way the oil bath air cleaner disclosed in my aforementioned patent.

In FIG. 1 of the drawing, an illustrative oil bath air cleaner is designated generally by the numeral 10 and may have the structure disclosed in my aforementioned patent. Forming one component of the air cleaner 10 is a filter bed 12 comprising a compressed mass of coils, which may be wire coils. Conventionally, these are constant-diameter coils, typically about ¼ inch in diameter and about 1 inch long. As previously explained, such constant-diameter coils tend to nest together closely throughout their overlapping lengths, thereby reducing the filtering ability of the bed 12. As also explained previously, I overcome this problem by providing each coil as a single coil with axially spaced portions of different diameters and with adjacent turns spaced from each other, all as shown in FIGS. 2 and 3, so that nesting of longitudinally overlapping portions is reduced, this being the important feature of the invention.

Figure 2:
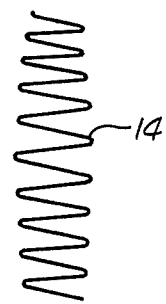
FIG. 2 is an elevational view of one embodiment of a filter bed coil of the invention.

FIG. 2 illustrates one filter bed coil 14 which embodies the invention. It will be noted that the coil 14 has a central portion of larger diameter than its end portions, so that two such coils lying adjacent each other through at least portions of their lengths cannot nest closely to interfere with filtering ability.

Figure 3:
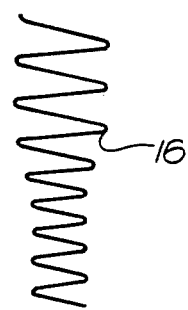
FIG. 3 is an elevational view of another embodiment of a filter bed coil of the invention.

FIG. 3 shows a coil 16 which achieves the same results when used with other, similar coils. It will be noted that, in the coil 16, one end portion is of larger diameter than the other, as opposed to making the central portion of larger diameter, as in the coil 14.

Figure 4:
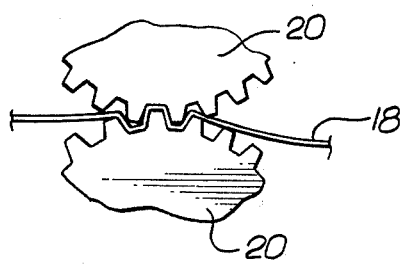
FIG. 4 is a diagrammatic view showing how metal wire used in making the coils of FIGS. 2 and 3 may be corrugated or kinked prior to coiling.
Figure 5:
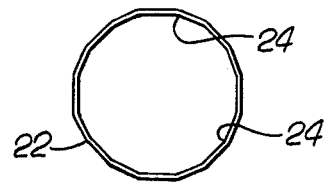
FIG. 5 is an enlarged view of one convolution of the coil of FIG. 2 or FIG. 3 showing the desired corrugating or kinking.

FIG. 4 illustrates diagrammatically how a length of wire 18 can be corrugated by passing it between corrugating rolls 20 prior to winding into either the coil 14, or the coil 16. In the winding process, the corrugations are straightened somewhat, leaving each convolution 22, FIG. 5, with circumferentially spaced indentations or kinks 24 on its inner side. These indentations 24 retain oil droplets, by capillary action, to further improve the filtering ability of a filter bed comprising a compressed mass of such corrugated or kinked coils.

Although exemplary embodiments of the invention have been disclosed for illustrative purposes, it will be understood that various changes, modifications and substitutions may be incorporated in such embodiments without departing from the invention as hereinafter claimed.

I claim as my invention:

1. A filter bed for an oil bath type air cleaner having only an air inlet and an air outlet, and comprising a compressed mass of coils, with at least some of said coils consisting of a single coil having axially spaced portions of different diameters and having adjacent turns spaced from each other, with said coils packed together in a compressed mass such that longitudinally overlapping coils do not nest together over their entire lengths.

2. A filter bed according to claim 1 wherein each coil has an axially central portion of larger diameter.

3. A filter bed as set forth in claim 1 wherein each coil has an end portion of larger diameter.

4. A filter bed according to claim 1 wherein the convolations of each coil are corrugated.

5. A filter bed as defined in claim 1 wherein each coil is formed of metal wire.

* * * * *

UNITED STATES PATENT AND TRADEMARK OFFICE
CERTIFICATE OF CORRECTION

PATENT NO. : 4,261,718
DATED : April 14, 1981
INVENTOR(S) : HERMAN H. GARNER

It is certified that error appears in the above-identified patent and that said Letters Patent are hereby corrected as shown below:

Column 1, line 5, change "Oct. 10, 1978" to --Oct. 27, 1978--

Signed and Sealed this

Seventh Day of July 1981

[SEAL]

Attest:

RENE D. TEGTMEYER

Attesting Officer     Acting Commissioner of Patents and Trademarks